(12) United States Patent
Kamikura et al.

(10) Patent No.: US 6,456,658 B2
(45) Date of Patent: Sep. 24, 2002

(54) BRIGHTNESS-VARIATION COMPENSATION METHOD AND CODING/DECODING APPARATUS FOR MOVING PICTURES

(75) Inventors: Kazuto Kamikura, Yokosuka; Hiroshi Watanabe, Kamakura; Hirohisa Jozawa, Yokohama, all of (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/832,451

(22) Filed: Apr. 11, 2001

Related U.S. Application Data (63) Continuation of application No. 08/921,352, filed on Aug. 29, 1997.

(30) Foreign Application Priority Data

Sep. 3, 1996 (JP) ............................................. 8-233002

(51) Int. Cl.[7] .............................................. H04N 7/18
(52) U.S. Cl. ............................ 375/240.15; 375/240.15; 375/240.12
(58) Field of Search ...................... 375/240.12–240.17

(56) References Cited

U.S. PATENT DOCUMENTS 5,544,239 A * 8/1996 Golin et al. ................. 382/236
5,734,431 A * 3/1998 Dachiku et al. ......... 375/240.13

* cited by examiner

*Primary Examiner*—Andy Rao
(74) *Attorney, Agent, or Firm*—Pennie & Edmonds LLP (57) ABSTRACT

A moving image brightness variation compensation method for encoding digital moving images for transmission and storage, and for image processing when editing moving images, the moving image brightness variation compensation method comprising a step of compensating for overall brightness variations by correcting a luminance value x of each pixel according to the formula $D_C \cdot x + D_B$, wherein $D_B$ is a parameter indicating a gain change and $D_C$ is a parameter indicating a contrast change, the parameters representing overall luminance changes between a reference image plane and an image plane being processed.

6 Claims, 7 Drawing Sheets

BRIGHTNESS-VARIATION COMPENSATION METHOD AND CODING/DECODING APPARATUS FOR MOVING PICTURES

This application is a continuation of application Ser. No. 08/921,352, filed Aug. 29, 1997.

BACKGROUND OF THE INVENTION

1. Field of the Invention

The present invention relates to a method of compensating for the overall brightness variation between image frames required for image processing such as in video editing and coding for efficient transmission and storage of digital video images.

2. Background Art

As a conventional coding technique for efficiently transmitting and storing video image data, a technique known as motion compensation interframe prediction coding has been widely used. With this technique, the luminance values (or color differences) of the image frames being processed are not directly transmitted and stored; instead, the technique measures how much objects inside an image have moved between a video image frame which has already been coded (referred to as a reference image frame) and the image frame being processed, and luminance difference values at positions which are shifted by the distance of movement are transmitted and stored.

Movement compensation interframe prediction coding enables transmission and storage of reduced quantities of data because the difference values are generally less than the luminance values themselves.

In this case, when measuring movement, it is usually assumed that the image frame being processed and the reference image frame have the same lighting conditions. That is, movement is detected under the assumption that corresponding objects in both frames have the same luminance values. However, the luminance values for corresponding objects can differ considerably between frames in cases such as when there is flickering, when a strobe light has flashed, or when the entire image is made gradually brighter (hereinafter referred to as "fade-in") or darker (hereinafter referred to as "fade-out") by adjusting the diaphragm of the camera or by using video editing equipment. Consequently, the following problems are associated with motion compensation interframe prediction coding:

(1) The detection of movement is not properly performed.

(2) The coding efficiency is not sufficiently improved.

As a conventional method principally for resolving the above-mentioned problem (1), there is a technique of measuring luminance changes between image frames, and performing movement measurements while correcting for the measured luminance changes.

Luminance changes can be largely separated into types wherein the degree of change changes according to the spatial position in the image frame, such as those which are caused by noise, and types wherein the degree of change is the same over the entire image frame, such as those which are caused by fade-ins and fade-outs.

Since it is important to measure the luminance changes as accurately as possible when attempting to resolve problem (1), the measurements are usually made in small areas within the frame in order to handle both types of luminance changes. However, although this resolves problem (1), the size of the interframe luminance difference values can still result in problem (2).

Thus, there is also a technique of reducing the interframe luminance difference values by transmitting and storing the luminance changes of the small areas as coded data, and correcting for these luminance changes at the decoder side. However, since this technique involves sending coded data expressing the luminance change for each small area, the quantities of data are ultimately increased to such a degree that the overall data quantity is not much different. In other words, the coding efficiency is not much improved.

On the other hand, there is a technique of measuring a single luminance change for the image frame as a whole, and transmitting and storing that luminance change as coded data for the purposes of improving the coding efficiency when the same luminance change has occurred over the entire image frame. With this technique, the quantity of coded data is extremely small because it is sufficient to send only a single piece of coded data expressing the luminance change for each image frame. Additionally, this technique contributes largely to the improvement of coding efficiency in cases of fade-ins and fade-outs because the interframe luminance change values can be made somewhat smaller simply by correcting for the luminance change.

As a specific parameter for expressing the overall luminance change, this technique uses only a parameter expressing the gain difference. That is, taking a parameter $D_B$ representing the gain difference, it is assumed that the luminance value x of each pixel will change to x' as shown in Equation 1:

$$x' = x + D_B \tag{1}$$

In this case, the luminance change x is always constant:

$$\Delta x = x' - x = D_B \tag{2}$$

Figure 3:
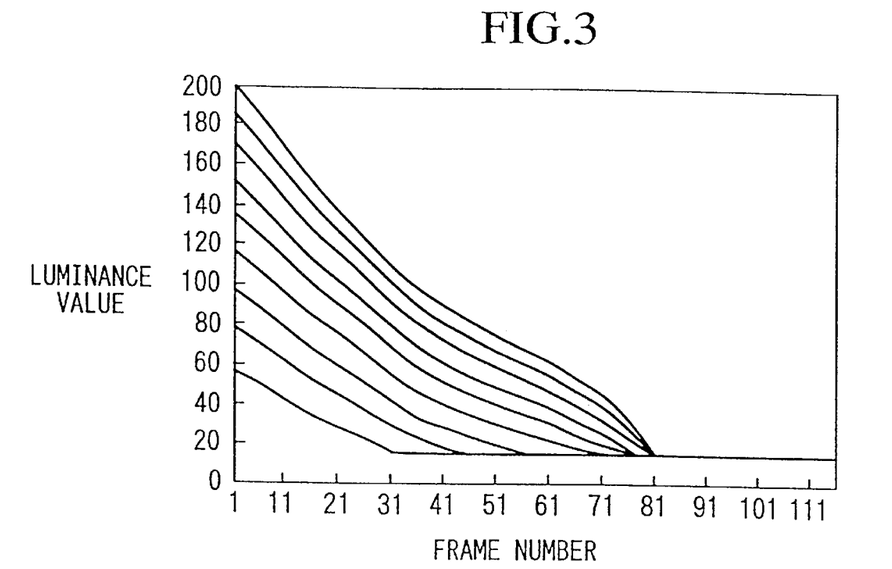
FIG. 3 is a diagram for explaining overall luminance changes of images.

FIG. 3 shows the changes in the luminance values in an actual case wherein a still image containing various brightness values was taken by a camera and the diaphragm of the camera was gradually closed so as to darken the overall image, i.e. a fade-out. When considering the changes in the luminance values from frame 1 to frame 11, or frame 11 to frame 21, the luminosity changes are approximately constant regardless of the luminance values themselves. Therefore, in this case, the assumption of Equation (1) holds. That is, the constant amount of change corresponds to $D_B$ in Equation (1).

Figure 4:
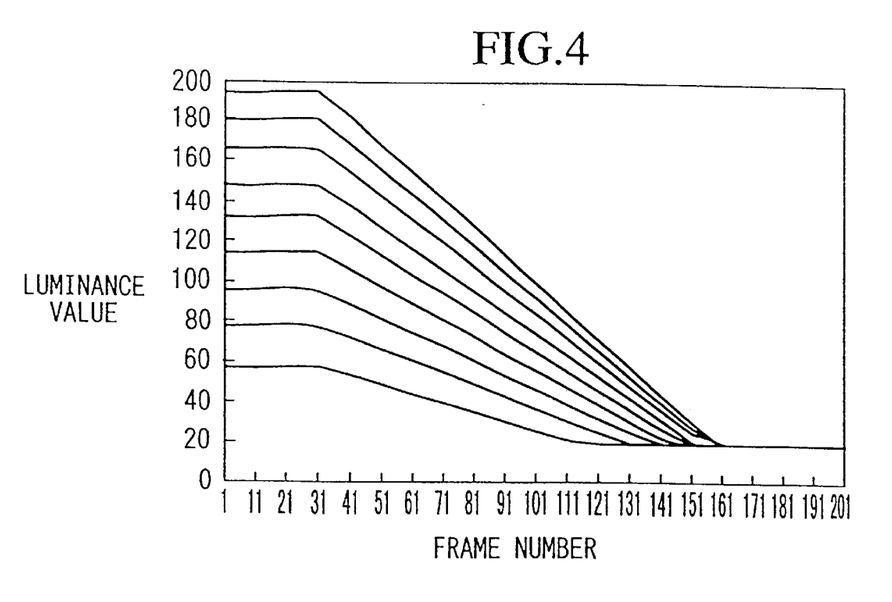
FIG. 4 is a diagram for explaining overall luminance changes of images.

On the other hand, FIG. 4 shows the changes in the luminance values in a case wherein the same still image was taken without changing the diaphragm of the camera, then a fade-out was caused using digital editing equipment. When considering the changes in the luminance values from frame 41 to frame 51, or frame 51 to frame 61, the luminance changes change depending on the luminance values. Therefore, the assumption of Equation (1) does not hold in this case, and the precision is insufficient to express overall luminance changes using only the parameter $D_B$.

When the images are divided into small areas of 8×8 pixels, the variations in the luminances of these small areas are generally not very large. For example, when the luminance value in the image frame overall changes from 0–255, the variations in the small areas are almost always in the range of 20–40. In this range, the luminance change can be considered to be approximately constant without regard to the luminance values themselves. That is, the assumption of Equation (1) is still appropriate if the luminance change is found only in small areas.

However, the range of luminance values broadens when the image frame is taken as a whole. That is, there is a considerable possibility that there will be luminance changes covering the entire range of luminance values 0–255. Therefore, the approximation of Equation (1) is insufficient for determining one type of luminance change over the entire image frame.

SUMMARY OF THE INVENTION

The object of the present invention is to offer a brightness variation compensation method and coding/decoding apparatus for moving images, capable of more efficiently coding moving images with overall brightness variations.

Therefore, the present invention offers a moving image brightness variation compensation method for encoding digital moving images for transmission and storage, and for image processing when editing moving images, the moving image brightness variation compensation method comprising a step of compensating for overall brightness variations by correcting a luminance value x of each pixel according to the formula $D_C \cdot x + D_B$, wherein $D_B$ is a parameter indicating a gain change and $D_C$ is a parameter indicating a contrast change, the parameters representing overall luminance changes between a reference image plane and an image plane being processed.

According to this method, coding procedures can be made more efficient when coding moving images having overall brightness variations, due to the use of a parameter indicating the contrast change in addition to a parameter indicating the gain change, when measuring or compensating for overall brightness variations.

Additionally, the present invention offers a moving image coding apparatus, comprising parameter determining means for determining a parameter $D_B$ indicating a gain change and a parameter $D_C$ indicating a contrast change, the parameters representing overall luminance changes between a reference image plane and an image plane being processed; and brightness variation compensation means for correcting a luminance value x of each pixel in the image plane being processed using the parameters $D_B$ and $D_C$ according to the formula $D_C \cdot x + D_B$.

According to this apparatus, coding procedures can be made more efficient when coding moving images having overall brightness variations, due to the use of a parameter indicating the contrast change in addition to a parameter indicating the gain change, when measuring or compensating for overall brightness variations.

Additionally, the present invention offers a computer-readable recording medium recording a moving image coding program, the moving image coding program containing instructions for a computer to execute a parameter determining step of determining a parameter $D_B$ indicating a gain change and a parameter $D_C$ indicating a contrast change, the parameters representing overall luminance changes between a reference image plane and an image plane being processed; and a brightness variation compensation step of correcting a luminance value x of each pixel in the image plane being processed using the parameters $D_B$ and $D_C$ according to the formula $D_C \cdot x + D_B$.

By reading the program recorded onto this recording medium and executing the program with a computer, coding procedures can be made more efficient when coding moving images having overall brightness variations, due to the use of a parameter indicating the contrast change in addition to a parameter indicating the gain change, when measuring or compensating for overall brightness variations.

Additionally, the present invention offers a computer-readable recording medium recording coded data of moving images, wherein the coded data includes a plurality of areas recording image plane coded data encoded by units of image planes, the areas recording image plane coded data comprising a parameter area recording parameters $D_B$ indicating gain changes and $D_C$ indicating contrast changes, the parameters representing overall luminance changes between reference image planes and image planes being processed; and a coded area recording data in units of image planes relating to differences in pixel values for corresponding pixels between the reference image planes and image planes wherein luminance values x of the pixels in the reference image planes have been corrected by using the parameters $D_B$ and $D_C$ according to the formula $D_C \cdot x + D_B$.

Since the coded data on this recording medium includes parameters indicating the contrast change in addition to parameters indicating the gain change when measuring or compensating for overall brightness variations, and includes data coded by using these parameters, coding procedures can be made more efficient when coding moving images having overall brightness variations.

DESCRIPTION OF PREFERRED EMBODIMENTS OF THE INVENTION

Hereinbelow, a brightness variation compensation method and moving image coding/decoding apparatus according to the present invention shall be explained. Brightness variation compensation of moving images and coding/decoding of moving images using brightness variation compensation are performed by units of image planes. Here, "image plane" is a comprehensive expression referring to an "image frame" corresponding to a single frame of a moving image or a "video object plane" (hereinafter abbreviated to "VOP") which is an image corresponding to the variation over time of the contents of a moving image. Below, an explanation will be made using image frames as examples of image planes. VOPs shall be explained separately later.

First, the brightness variation compensation method for moving images according to the present invention shall be explained.

The brightness variation compensation method of the present invention compensates for overall brightness variations by correcting the luminance value x of each pixel by $D_C \cdot x + D_B$, wherein $D_B$ represents the gain change and $D_C$ represents the contrast change.

In order to resolve the above problems, the moving image brightness variation compensation method of the present invention makes the assumption that the luminance value x of each pixel changes to x' as shown in Equation (3) due to the parameter $D_B$ representing the gain change and the parameter $D_C$ representing the contrast change.

$$x' = D_C \cdot x + D_B \quad (3)$$

In this case, the luminance change $\_x$ depends on the luminance value x of the pixel.

$$\Delta x = x' - x = (D_C - 1) \cdot x + D_B \quad (4)$$

As described above, when determining a single type of brightness variation over the entire image frame, the use of the Equation (3) which is capable of expressing the brightness variation as a function of the luminance values themselves is highly significant in that the coding efficiency is improved when brightness variations of the image overall such as fade-ins and fade-outs occur.

According to an embodiment of the present invention, the parameter $D_B$ representing the gain change and the parameter $D_C$ representing the contrast change are determined under the condition of minimizing the sum of the squared differences between corresponding pixels in the image frame being processed and the reference image frame.

With the luminance change measuring method for moving images according to the present invention, the two parameters $D_B$ and $D_C$ are measured for each block of K×L (wherein K and L are natural numbers) pixels in the image frame being processed. At this time, as a criterion for calculating these parameters, the sums of the squared differences between corresponding pixels in the image frame being processed and the reference image frame are minimized. Next, the mean value or the most frequent value of each of the two parameters $D_B$ and $D_C$ calculated for the blocks of K×L pixels is taken as the parameter for the image frame being processed overall.

Hereinbelow, the equations for determining the parameters for each block of K×L pixels are derived. The two parameters for the i-th block are represented by $D_B(i)$ and $D_C(i)$, while the pixel values in each block of K×L pixels in the image frame being processed are represented by $y_{k,l}$ and the pixel values in each block of K×L pixels in the reference image frame are represented by $x_{k,l}$. As described above, the criterion for calculating the parameters is to minimize the sum of the squared differences J between corresponding pixels in the image frame being processed and the reference image frame. That is:

$$J = \sum_{l=1}^{L} \sum_{k=1}^{K} \{y_{k,l} - (D_C(i) \cdot x_{k,l} + D_B(i))\}^2 \quad (5)$$

Taking the partial derivatives of J with respect to $D_C(i)$ and $D_B(i)$, then setting them equal to zero results in the following:

$$\frac{\partial J}{\partial D_C(i)} = \sum_{l=1}^{L} \sum_{k=1}^{K} (2 D_C(i) x_{k,l}^2 - 2 x_{k,l} y_{k,l} + 2 x_{k,l} D_B(i)) = 0 \quad (6)$$

$$\therefore \sum_{l=1}^{L} \sum_{k=1}^{K} (D_C(i) x_{k,l}^2 - x_{k,l} y_{k,l} + x_{k,l} D_B(i)) = 0$$

$$\frac{\partial J}{\partial D_B(i)} = \sum_{l=1}^{L} \sum_{k=1}^{K} (2 D_C(i) x_{k,l} - 2 y_{k,l} + 2 D_B(i)) = 0 \quad (7)$$

$$\therefore \sum_{l=1}^{L} \sum_{k=1}^{K} (D_C(i) x_{k,l} - y_{k,l} + D_B(i)) = 0$$

Equations (6) and (7) further give the following:

$$D_C(i) = \frac{K \cdot L \cdot Z - X \cdot Y}{K \cdot L \cdot T - X^2} \quad (8)$$

$$D_B(i) = \frac{T \cdot Y - X \cdot Y}{K \cdot L \cdot T - X^2} \quad (9)$$

wherein:

$$X = \sum_{l=1}^{L} \sum_{k=1}^{K} x_{k,l} \quad (10)$$

$$Y = \sum_{l=1}^{L} \sum_{k=1}^{K} y_{k,l}$$

$$T = \sum_{l=1}^{L} \sum_{k=1}^{K} x_{k,l}^2$$

$$Z = \sum_{l=1}^{L} \sum_{k=1}^{K} (x_{k,l} \cdot y_{k,l})$$

As mentioned above, the mean values or most frequent values of the two parameters $D_C(i)$ and $D_B(i)$ calculated for each block of K×L pixels by means of Equations (8) and (9) are taken as the parameters $D_C$ and $D_B$ for the entire image being processed.

The moving image coding apparatus according to the present invention has parameter determining means for determining the parameter $D_B$ representing the gain change and the parameter $D_C$ representing the contrast change as parameters which represent the overall luminance change between the image frame being processed and the reference image frame, and brightness variation compensation means for correcting the luminance value x of each pixel in the reference image frame using the parameters $D_B$ and $D_C$, according to the formula $D_C \cdot x + D_B$.

According to an embodiment of the present invention, the parameter determining means determines the parameters $D_B$ and $D_C$ by minimizing the sum of the squared differences between corresponding pixels in the image frame being processed and the reference image frame.

In one embodiment of the present invention, the parameter determining means calculates the parameters $D_B$ and $D_C$ for each of n (wherein n is an integer greater than or equal to 2) blocks composed of K×L (wherein K and L are natural numbers) pixels in the image frame being processed, then determines the pair of parameters $D_B$ and $D_C$ having the highest frequency to be the parameters $D_B$ and $D_C$ for the entire image frame being processed.

In another embodiment of the present invention, the parameter determining means calculates the parameters $D_B$ and $D_C$ for each of n (wherein n is an integer greater than or equal to 2) blocks composed of K×L (wherein K and L are natural numbers) pixels in the image frame being processed, then determines the mean values of the parameters $D_B$ and $D_C$ to be the parameters $D_B$ and $D_C$ for the entire image frame being processed A moving image decoding apparatus according to the present invention has brightness variation compensation means for correcting the luminance values x of each pixel in the reconstructed image frame after decoding has been completed, using the parameters $D_B$ and $D_C$ determined by the moving image coding apparatus, according to the formula $D_C \cdot x + D_B$.

Next, embodiments of the present invention shall be explained with reference to the drawings.

Figure 1:
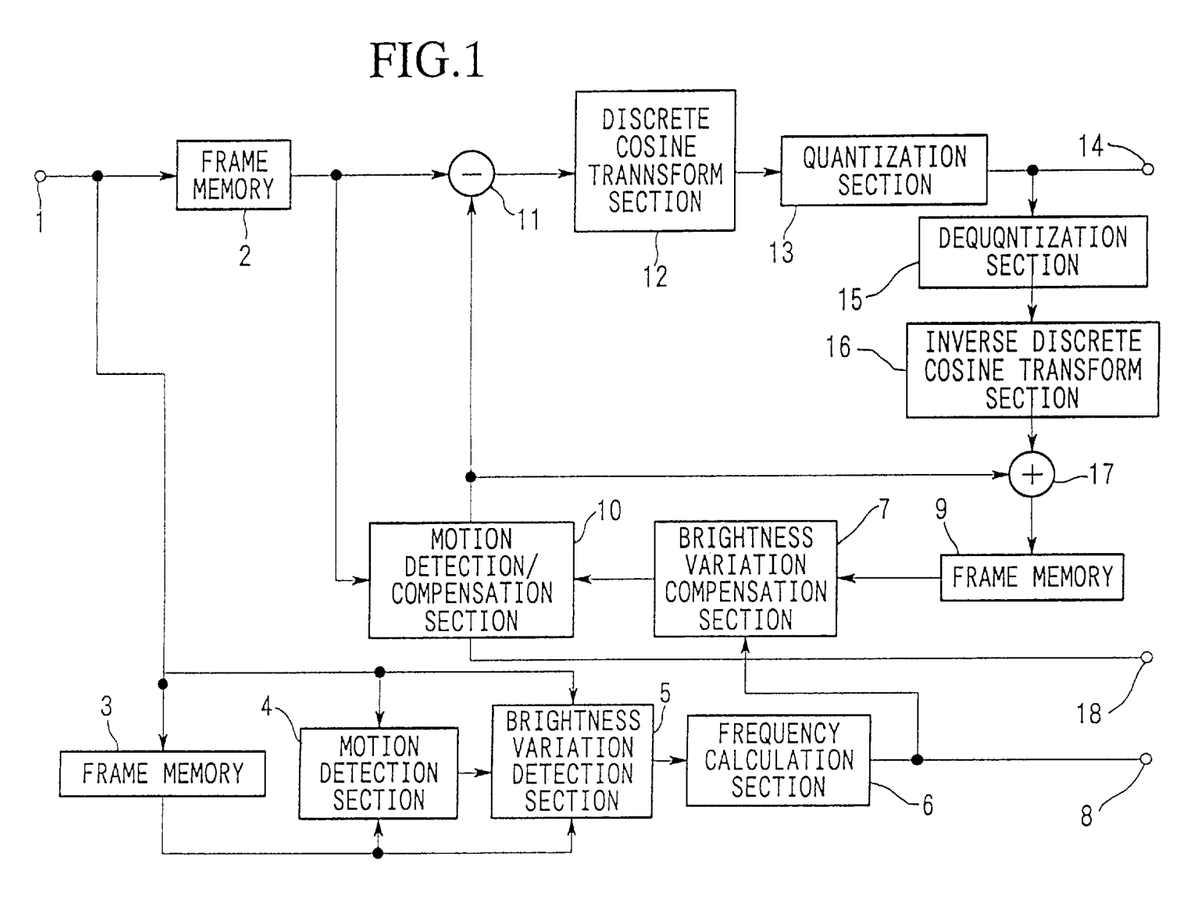
FIG. 1 is a block diagram showing a moving image coding apparatus using the moving image luminance change compensation method of the present invention.

FIG. 1 is a block diagram showing a moving image coding apparatus using the moving image brightness variation compensation method of the present invention.

The moving image coding apparatus comprises an input terminal 1, frame memories 2 and 3, a motion detection section 4, a brightness variation detection section 5, a frequency calculation section 6, a brightness variation compensation section 7, an output terminal 8, a frame memory 9, a motion detection/compensation section 10, a subtractor 11, a discrete cosine transform section 12, a quantization section 13, an output terminal 14, a dequantization section 15, an inverse discrete cosine transform section 16, an adder 17, and an output terminal 18.

An N-th frame original image is inputted from the input terminal 1 into frame memory 2, frame memory 3, motion detection section 4 and brightness variation detection section 5. The frame memory 3 stores the N-th frame original image, and sends the (N−1)-th frame original image which had been stored to the motion detection section 4 and the brightness variation detection section 5.

Figure 5:
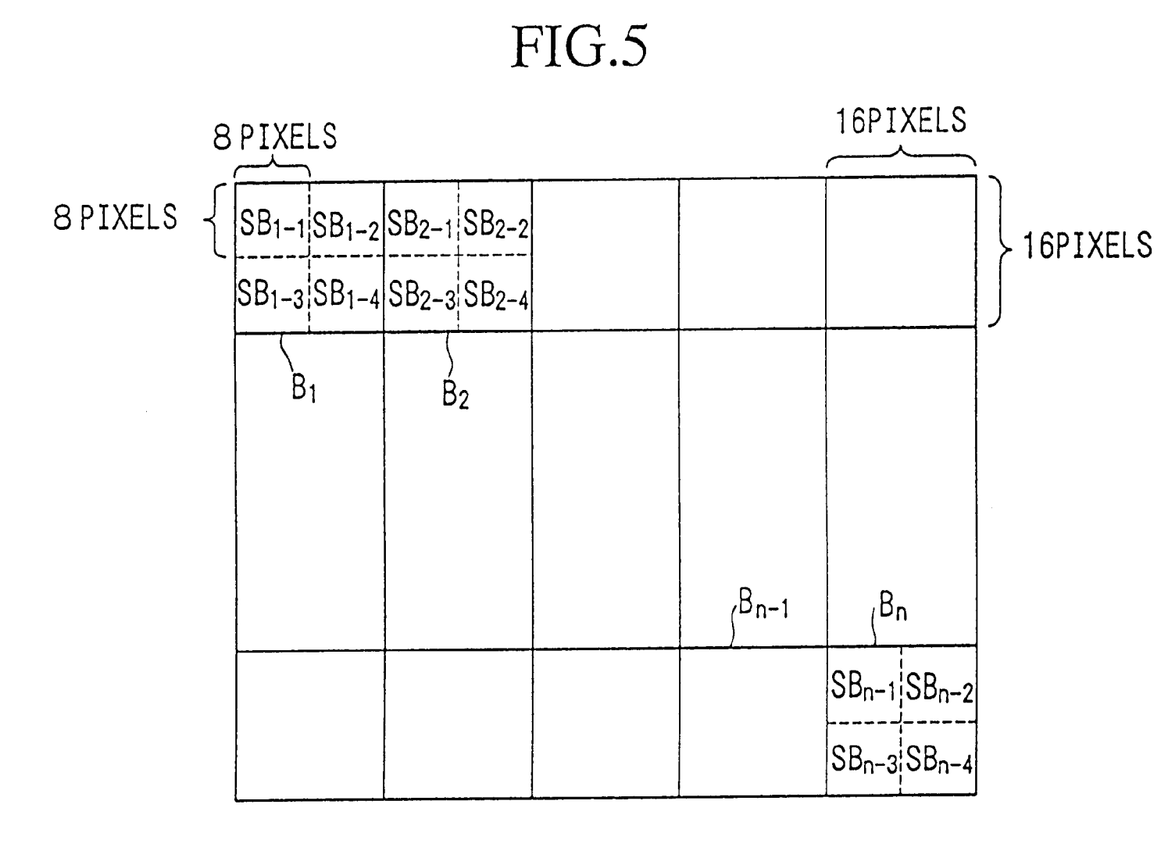
FIG. 5 is a diagram for explaining the manner of division of an image frame.

The motion detection section 4 determines the movement of the N-th frame original image with respect to the (N−1)-th frame original image for each block of 16×16 pixels as shown in FIG. 5, by means of a block matching method. Assuming the number of blocks in each frame to be n, the blocks are labelled as $B_1, B_2, \ldots, B_n$. Additionally, the motion vector calculated for each block $B_i$ is expressed by $V_i$. The motion vector $V_i$ is sent to the brightness variation detection section 5. At the brightness variation detection section 5, the two parameters $D_C(i)$ and $D_B(i)$ are calculated for each block $B_i$, using the luminance values of the 16×16 pixels in each block $B_i$ of the N-th frame original image and the luminance values of the 16×16 pixels at positions shifted by the vector $V_i$ in the (N−1)-th frame original image. The resulting two parameters $D_C(i)$ and $D_B(i)$ are sent to the frequency calculation section 6. At the frequency calculation section 6, the frequencies of $D_C(i)$ and $D_B(i)$ are determined over a single frame, the pair of parameters with the highest frequency are taken to be the parameters $D_C(i)$ and $D_B(i)$ representing the overall brightness variation between the N-th frame original image and the (N−1)-th frame original image, and these values are sent to the brightness variation compensation section 7 and sent outside through the output terminal 8.

On the other hand, the N-th frame original image inputted from the input terminal 1 is delayed by the frame memory 2 for one frame, and then inputted into the subtractor 11. The (N−1)-th frame reconstructed image is stored in the frame memory 9, and the brightness variation compensation section 7 compensates for the brightness variations of the luminance values x in the images by means of Equation (3), and inputs the values x' which have been compensated for brightness variation into the motion detection/compensation section 10.

The subtractor 11 takes the difference between the data and sends the difference to the discrete cosine transform section 12. The discrete cosine transform section 12 performs a discrete cosine transform of data for one block composed of 16×16 pixels in units of 8×8 pixels, then the resulting discrete cosine transform coefficient is quantized by the quantization section 13. The quantized discrete cosine transform coefficient is sent outside through the output terminal 14 and also dequantized by the dequantization section 15, then inverse discrete cosine transformed by the inverse discrete cosine transform section 16. The adder 17 adds data sent from the motion detection/compensation section 10 to that data, then stores the result in the frame memory 9 as a N-th frame reconstructed image. The N-th frame reconstructed image stored in the frame memory 9 is used as a reference image when coding the image of the next frame (i.e. the (N+1)-th frame).

Alternatively, the average values of the parameters $D_C(i)$ and $D_B(i)$ (wherein i=1−n) can also be taken as the parameters $D_C$ and $D_B$.

Figure 2:
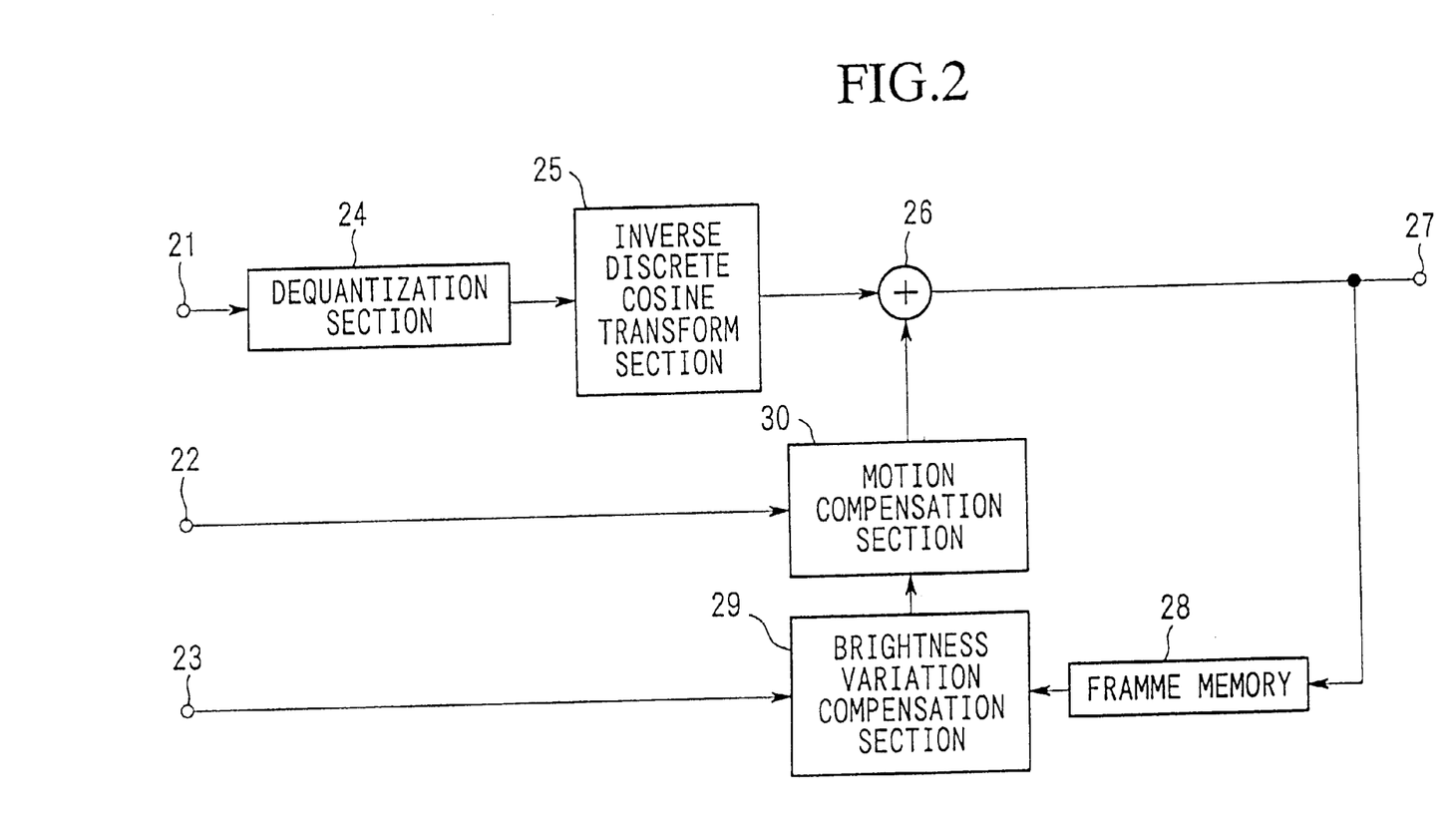
FIG. 2 is a block diagram showing a moving image decoding apparatus using the moving image luminance change compensation method of the present invention.

The data coded by the moving image coding apparatus is decoded by the moving image decoding apparatus shown in FIG. 2, using the moving image brightness variation compensation method of the present invention.

The moving image decoding apparatus comprises input terminals 21–23, a dequantization section 24, an inverse discrete cosine transform section 25, an adder 26, an output terminal 27, a frame memory 28, a brightness variation compensation section 29, and a motion compensation section 30.

The quantized discrete cosine transform coefficient outputted by the output terminal 14 of FIG. 1 is inputted into the input terminal 21. A movement vector for each block outputted from the output terminal 18 of FIG. 1 is inputted into the input terminal 22. The two parameters $D_C$ and $D_B$ representing the brightness variation for each frame outputted from the output terminal 8 is inputted into the input terminal 23.

In this case, it is assumed that coded data of a block $B_i$ (16×16 pixels) of the N-th frame image is inputted. That is, the quantized discrete cosine transform coefficient of block $B_i$ is inputted into the input terminal 21. The movement vector $V_i$ of block $B_i$ is inputted into the input terminal 22. The two parameters $D_C$ and $D_B$ which are values identical throughout the entire N-th frame are inputted into the input terminal 23.

The quantized discrete cosine transform coefficient inputted from the input terminal 21 is dequantized by the dequantization section 24, then inverse discrete cosine transformed by the inverse discrete cosine transform section 25 and sent to the adder 26.

The frame memory 28 contains (N−1)-th frame reconstructed image data which has already been decoded. The brightness variation compensation section 29 performs brightness variation compensation of each luminance value x in the image by means of Equation (3), then inputs the brightness variation compensated values x' into the motion compensation section 30. The motion compensation section 30 compensates for a shift by the movement vector $V_i$, and inputs the result into the adder 26.

The adder 26 obtains a N-th frame reconstructed image by adding the data from the inverse discrete cosine transform section 25 with the data from the motion compensation section 30, outputs the result to the output terminal 27 and also stores the result in the frame memory 28 for use as a reference image when decoding the image of the next frame (i.e. the (N+1)-th frame).

Next, the data structure when recording coded data generated by the moving image coding apparatus shown in FIG. 1 onto a computer-readable recording medium shall be explained with reference to FIG. 6.

In this case, the coded data is coded by units of image frames, and is composed of a plurality of coded image frames. While the structures of the coded data of the image frames in FIG. 6 are identical, the coded data of the N-th frame which is the coded data of the N-th image frame shall be explained.

Figure 6:
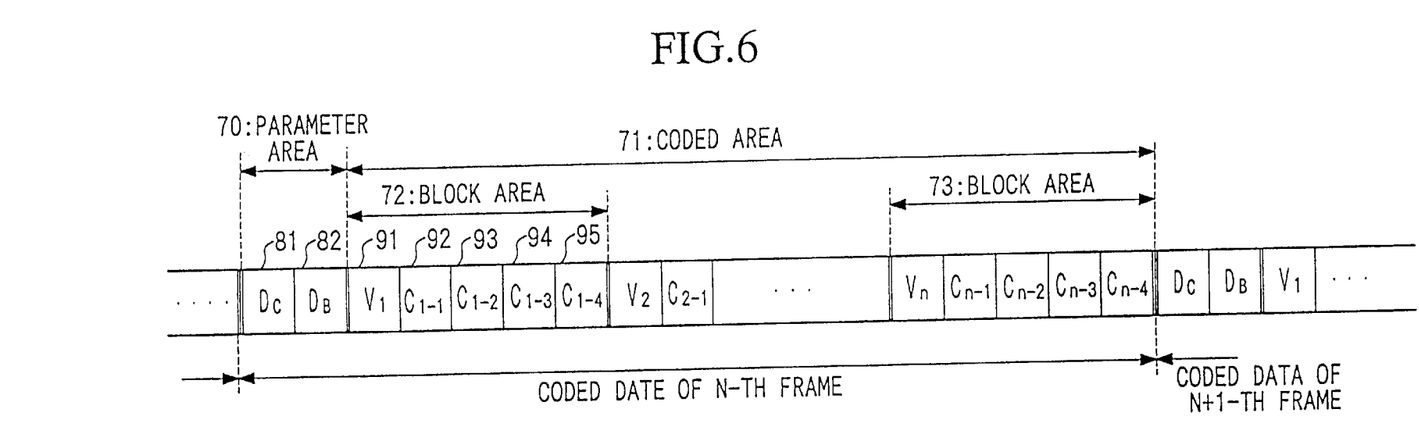
FIG. 6 is a diagram for explaining the structure of coded data in the present invention.

As shown in FIG. 6, the coded data of the N-th frame is composed of a parameter area 70 which is an area for recording the parameter $D_C \cdot 81$ and the parameter $D_B \cdot 82$, and a coded area 71 recording coded data of pixel value difference data for each corresponding pixel in the N-th image frame and the image frame corrected by using the parameters $D_C \cdot 81$ and $D_B \cdot 82$ in accordance with the formula $D_C \cdot x + D_B$. Furthermore, the coded area 71 is composed of block areas 72 and 73 containing coded data for each block of 16×16 pixels shown in FIG. 5. When there are $B_1$-$B_n$ blocks of 16×16 pixels as shown in FIG. 5, the coded area 71 is composed of n block areas as shown in FIG. 6.

Each block area is composed of a movement vector $V_i$ for each block, and four areas $C_{i-1}$–$C_{i-4}$ for storing coded data of each of four sub-blocks obtained by dividing each block into 8×8 pixels. Taking the first block area 72 in FIG. 6 as an example, reference numeral 91 corresponds to the movement vector and the reference numerals 92–95 correspond to data coded for each sub-block.

Here, the relationship between the coded data of FIG. 6 and the outputs from the moving image coding apparatus of FIG. 1 is such that the parameters $D_C \cdot 81$ and $D_B \cdot 82$ correspond to the output values from the output terminal 8 of the frequency calculation section 6 of FIG. 1. Additionally, the movement vector of each block area (e.g. reference numeral 91) corresponds to the output from the output terminal 18 of the motion detection/compensation section 10 of FIG. 1, and the coded data of each sub-block (e.g. reference numerals 92–95) correspond to the output values from the output terminal 14 of the quantization section 13.

Additionally, in the case of the structure of coded data shown in FIG. 6, the output activity of the moving image coding apparatus shown in FIG. 1 is as follows.

First, the parameters $D_C \cdot 81$ and $D_B \cdot 82$ indicating the brightness change in the image frame overall are outputted.

Next, the movement vector $V_1 \cdot 91$ of the block $B_1$ shown in FIG. 5 and the coded data $C_{1-1} \cdot 92$–$C_{1-4} \cdot 95$ for each sub-block $SB_{1-1}$–$SB_{1-4}$ are outputted.

Then, the movement vector $V_1$ and the coded data $C_{1-1}$-$C_{1-4}$ are sequentially outputted for the block $B_1$, and the same procedure is repeated for each block until the final block $B_n$.

This operation is performed for each image frame, and the coded data are recorded.

When decoding the coded data shown in FIG. 6, the parameters $D_C \cdot 81$ and $D_B \cdot 82$ of the parameter areas of FIG. 6 are inputted into the input terminal 23 of the moving image decoding apparatus, then the movement vector $V_i$ for each block area is inputted into the input terminal 22 and the coded data $C_{1-1}$–$C_{1-4}$ of each sub-block is inputted into the input terminal 21, in order to decode for each image frame.

Figure 7:
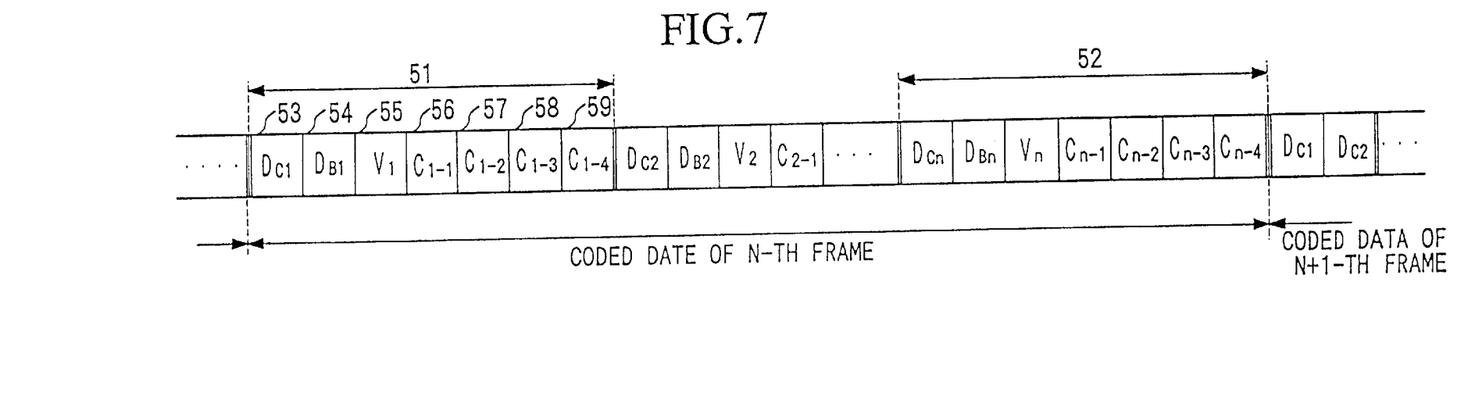
FIG. 7 is a diagram showing the structure of coded data for a case wherein an area is provided to record the parameters for each block.

FIG. 7 is a diagram showing a coded data structure for recording the movement vector 55, coded data 56–59 of each sub-block and the parameters $D_C \cdot 53$ and $D_B \cdot 54$ of each block by the block areas indicated by the reference numerals 51 and 52. In the case of fade-in and fade-out, there are no large differences in the coding efficiency in sub-block units either when the parameters $D_C$ and $D_B$ are determined by the block or when the parameters $D_C$ and $D_B$ are determined uniquely for the entire image frame. For example, when the size of the image frame is 352×240 pixels (330 blocks of 16×16 pixels) and the parameters $D_C$ and $D_B$ are each eight bits long, then the coded data shown in FIG. 6 can be made less than the coded data shown in FIG. 7 by 5264 bits (={8+8}×{330−1}) per image frame.

Figure 8:
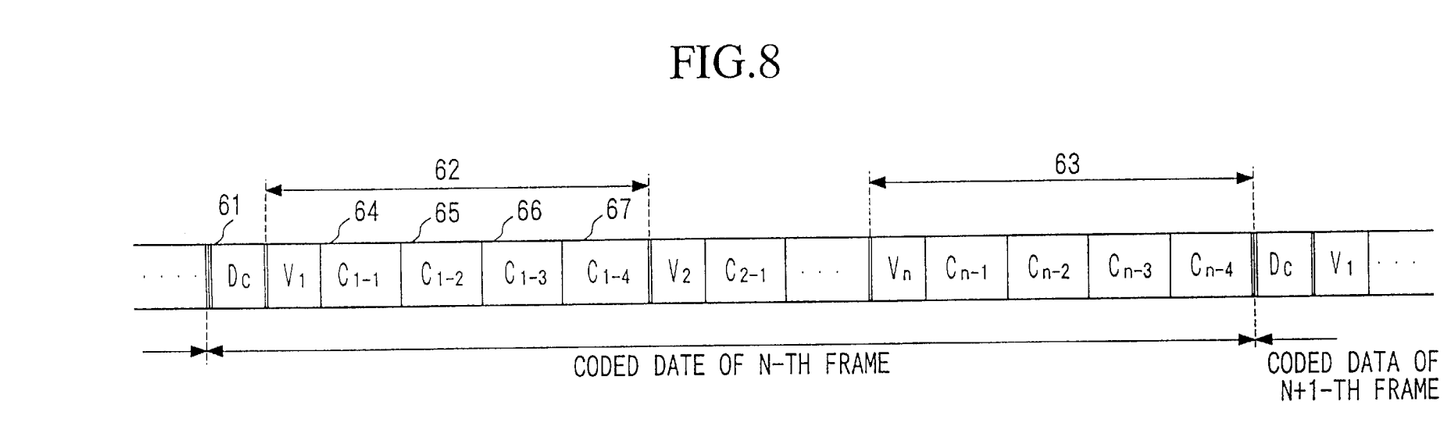
FIG. 8 is a diagram showing the structure of coded data for a case wherein an area is provided to record only the parameter $D_B$ which represents the gain change for each image frame.

FIG. 8 is a diagram showing the structure of the coded data when only a single parameter $D_C \cdot 61$ representing the gain change for each image frame is recorded, and when the structures of the block areas as indicated by reference numerals 62 and 63 are identical to the case for FIG. 6. In this case, assuming the parameters $D_C$ and $D_B$ are eight bits long, the coded data of FIG. 8 is eight bits shorter per image frame than the coded data of FIG. 6. However, in the case of fade-ins and fade-outs, when the brightness variation changes according to the luminance values themselves as shown in FIG. 4, the approximation of the brightness variation is insufficient, even if the luminance values x of the pixels in the reference image plane are corrected by the parameter $D_C$. For this reason, the discrete cosine transformed difference values are relatively large, as a result of which the amount of coded data for each sub-block (e.g. reference numerals 64–67) increases, and the amount of coded data for a single image frame overall increases.

As explained above, the coding efficiency can be increased by configuring the coded data as shown in FIG. 6.

While examples of outputting $D_C$ and $D_B$ by units of image frames have been described in the above embodiments, the present invention is not limited thereby, and the units may correspond to the image frames; for example, the units may be video object planes (VOPs) in the standardized MPEG-4 (Moving Picture Experts Group—Phase 4) coding format for color video images. That is, the parameters $D_C$ and $D_B$ can be determined between a reference VOP and a VOP being processed, and brightness variation compensation and coding/decoding can be performed using these parameters. In this case, the structure of the coded data will be such that the parameters $D_C$ and $D_B$ are recorded as pairs with the coded data of the VOPs which have been brightness variation compensated using these parameters, in the structure of the MPEG-4 coded data. That is, in the case of an MPEG-4 data structure, when standard data used as a header is included at the top of the frame, for example when all of the discrete cosine transforms in sub-block $SB_{1-1}$ of FIG. 5 result in zero, then the data of FIG. 6 will be different from the coded data for each frame as shown in FIG. 6 in that the coded data $C_{1-1}$ will be encoded with data signifying that "the data of that sub-block are all zero". Although there will be differences such as this, there will be no difference with respect to FIG. 6 in that the parameters $D_C$ and $D_B$ of the parameter area 70 and the coded data areas (corresponding to the coded area 71 of FIG. 6) of the VOPs brightness variation transformed by using these parameters form pairs.

The MPEG standard coded data structure is described in detail in T. Ebrahimi, "MPEG-4 video verification model: A video encoding/decoding algorithm based on content representation" *Signal Processing: Image Communication,* vol. 9, no. 4, pp. 367–384, May 1997.

Figure 9:
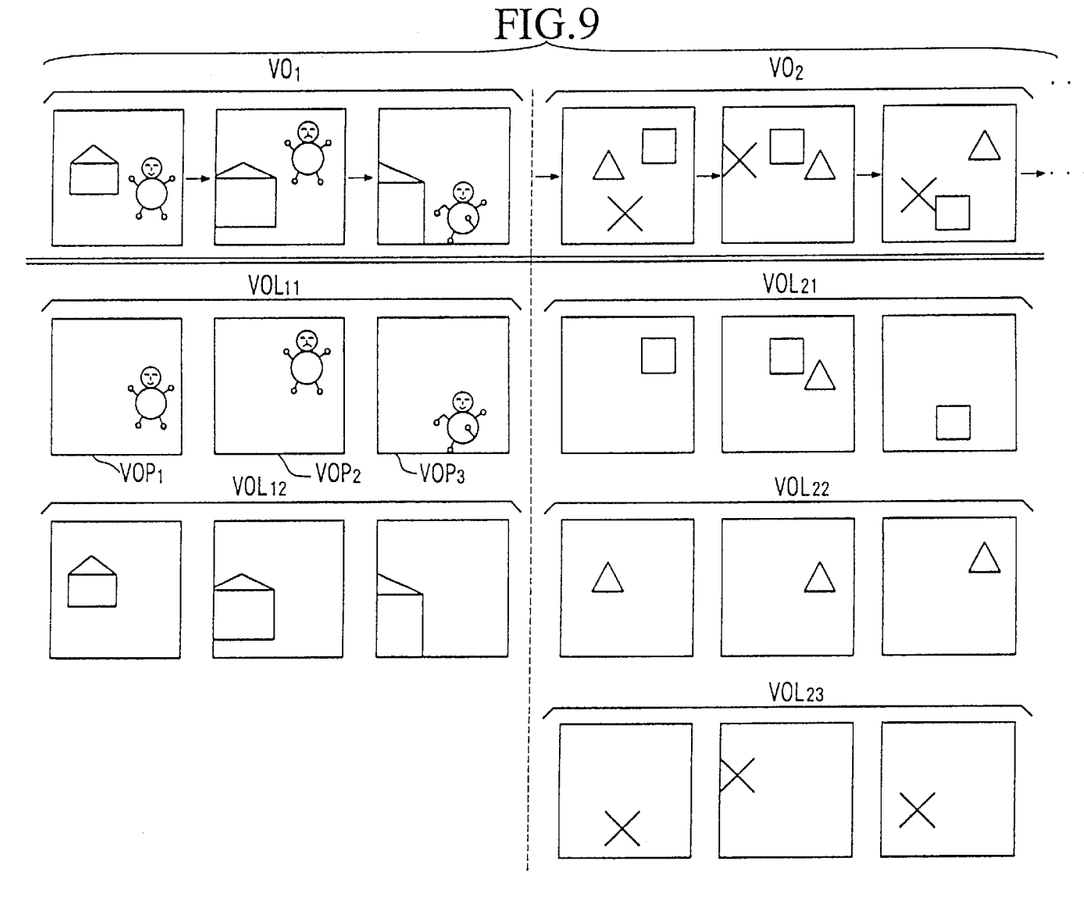
FIG. 9 is a diagram for explaining the video object (VO), video object layer (VOL) and the video object plane (VOP) in MPEG-4.

Here, the layered structure of MPEG-4 shall be explained briefly with respect to the drawings. That is, a video image is composed of a collection of one or more single shots referred to as video objects (hereinafter abbreviated to VO). FIG. 9 shows two shots referred to as $VO_1$ and $VO_2$.

Each VO is composed of a collection of one or more collections of video image contents referred to as video object layers (hereinafter abbreviated to VOL). For example, in FIG. 9, $VO_1$ is composed of the two VOLs which are a snowman $VOL_{11}$ and a house $VOL_{12}$. $VO_2$ is composed of the three VOLs which are a square $VOL_{21}$, a triangle $VOL_{22}$ and an X $VOL_{23}$.

Additionally, each VOL is composed of a collection of images referred to as video object planes wherein the contents change over time. For example $VOL_{11}$ is composed of a collection of the three VOPs $VOP_1$–$VOP_3$.

Each of these VOPs can be encoded using the above-mentioned parameters $D_C$ and $D_B$.

While a discrete cosine transform is performed when coding and decoding in the examples of the above embodiments, the present invention is not limited thereby, and it is possible to use other orthogonal transforms such as Hadamard transforms or wavelet transforms.

Additionally, while each block has 16×16 pixels and each sub-block has 8×8 pixels in the above-described embodiments as shown in FIG. 5, the present invention is not necessarily limited thereby.

Additionally, the coding or decoding of moving images can be performed by recording a program for executing the operations of the moving image coding apparatus of FIG. 1 or the moving image decoding apparatus of FIG. 2 onto a computer-readable recording medium, then reading the program recorded onto this recording medium by a computer, and executing the program.

What is claimed is:

1. A moving image brightness variation compensation method for encoding digital moving images for transmission and storage, and for image processing when editing moving images, said moving image brightness variation compensation method comprising:

correcting a luminance value x of each pixel according to the formula $D_C \cdot x + D_B$, wherein $D_B$ is a parameter indicating a gain change and $D_C$ is a parameter indicating a contrast change, the parameters representing overall luminance changes between a reference image plane and an image plane being processed, and being determined by using differences in luminance values between corresponding pixels in the reference image plane and the image plane being processed;

wherein the parameters $D_B$ and $D_C$ for the entire image plane being processed are determined by using the two parameters $D_B$ and $D_C$ for each of n blocks, n being an integer of at least 2, and the two parameters $D_B$ and $D_C$ for each of n blocks are determined by minimizing the sum of squared differences in luminance values between corresponding pixels in a reference block in the reference image plane and a block being processed in the image plane being processed; and taking the most frequent values of the parameters $D_B$ and $D_C$ for each of n blocks as the parameters $D_B$ and $D_C$, respectively, for the entire image plane being processed.

2. A moving image brightness variation compensation method in accordance with claim 1, wherein said image plane is an image frame or a video object plane.

3. A moving image coding apparatus comprising:

parameter determining means for determining a parameter $D_B$ indicating a gain change and a parameter $D_C$ indicating a contrast change, the parameters representing overall luminance changes between a reference image plane and an image plane being processed, and being determined by using differences in luminance values between corresponding pixels in the reference image plane and the image plane being processed, wherein the parameters $D_B$ and $D_C$ for the entire image plane being processed are determined by using the two parameters $D_B$ and $D_C$ for each of n blocks, n being an integer of at least 2, and the two parameters $D_B$ and $D_C$ for each of n blocks are determined by minimizing the sum of squared differences in luminance values between corresponding pixels in a reference block in the reference image plane and a block being processed in the image plane being processed; and taking the most frequent values of the parameters $D_B$ and $D_C$ for each of n blocks as the parameters $D_B$ and $D_C$, respectively, for the entire image plane being processed; and brightness variation compensation means for correcting a luminance value x of each pixel in said image being processed using said most frequent values of the parameters $D_B$ and $D_C$, respectively, according to formula $D_C \cdot x + D_B$.

4. A moving image coding apparatus in accordance with claim 3, wherein said image plane is an image frame or a video object plane.

5. A computer-readable recording medium recording a moving image coding program, said moving image coding program containing instructions for a computer to execute:

a parameter determining step of determining a parameter $D_B$ indicating a gain change and a parameter $D_C$ indicating a contrast change, the parameters representing overall luminance changes between a reference image plane and an image plane being processed, and being determined by using differences in luminance values between corresponding pixels in the reference image plane and the image plane being processed, wherein the parameters $D_B$ and $D_C$ for the entire image plane being processed are determined by using the two parameters $D_B$ and $D_C$ for each of n blocks, n being an integer of at least 2, and the two parameters $D_B$ and $D_C$ for each of n blocks are determined by minimizing the sum of squared differences in luminance values between corresponding pixels in a reference block in the reference image plane and a block being processed in the image being processed; and taking the most frequent values of the parameters $D_B$ and $D_C$ for each of n blocks as the parameters $D_B$ and $D_C$, respectively, for the entire image plane being processed; and a brightness variation compensation step of correcting a luminance value x of each pixel in said image plane being processed using said most frequent values of the parameters $D_B$ and $D_C$, respectively, according to the formula $D_C \cdot x + D_B$.

6. A computer-readable recording medium recording a moving image coding program in accordance with claim 5, wherein said image plane is an image frame or a video object plane.

* * * * *

UNITED STATES PATENT AND TRADEMARK OFFICE
CERTIFICATE OF CORRECTION

PATENT NO.     : 6,456,658 B2
DATED          : September 24, 2002
INVENTOR(S)    : Kazuto Kamikura; Hiroshi Watanabe and Hirohisa Jozawa It is certified that error appears in the above-identified patent and that said Letters Patent is hereby corrected as shown below:

Column 6,
Please replace:

$$D_B(i) = \frac{T \cdot Y - X \cdot Y}{K \cdot L \cdot T - X^2} \quad (9)$$

with $$D_B(i) = \frac{T \cdot Y - X \cdot Z}{K \cdot L \cdot T - X^2} \quad (9)$$

Signed and Sealed this

Sixth Day of May, 2003

JAMES E. ROGAN
*Director of the United States Patent and Trademark Office*